(12) United States Patent
Nahm et al.

(10) Patent No.: US 7,252,324 B1
(45) Date of Patent: Aug. 7, 2007

(54) SPOILER FOR VEHICLES AND MANUFACTURING METHOD THEREOF

(75) Inventors: Alexander Hong Nahm, Gyeongsangbug-so (KR); O Yeol Kwon, Daegu-si (KR)

(73) Assignee: Moya International Co., Ltd., Gyeongsangbug-Do (KR)

( * ) Notice: Subject to any disclaimer, the term of this patent is extended or adjusted under 35 U.S.C. 154(b) by 0 days.

(21) Appl. No.: 11/461,948

(22) Filed: Aug. 2, 2006

(51) Int. Cl.
*B62D 37/02* (2006.01)
*B29C 49/20* (2006.01)
*B64C 3/18* (2006.01)

(52) U.S. Cl. .................. 296/180.1; 264/515; 264/516; 244/123.1

(58) Field of Classification Search ............ 296/180.1; 425/503, 522, DIG. 122; 264/273, 515, 264/516; 244/123.1, 123.12, 123.13, 123.4, 244/123.5, 123.6
See application file for complete search history.

(56) References Cited

U.S. PATENT DOCUMENTS

| | | | | |
|---|---|---|---|---|
| 1,985,649 A | * | 12/1934 | Wallis | 244/123.4 |
| 2,115,504 A | * | 4/1938 | Wallis | 52/726.2 |
| 2,371,754 A | * | 3/1945 | Gillum et al. | 428/594 |
| 2,451,131 A | * | 10/1948 | Vidal et al. | 156/222 |
| 2,734,586 A | * | 2/1956 | Wright et al. | 416/226 |
| 3,020,986 A | * | 2/1962 | Kirk et al. | 52/793.1 |
| 3,910,531 A | * | 10/1975 | Leomand | 244/119 |
| 4,453,367 A | * | 6/1984 | Geyer et al. | 52/793.1 |
| 4,739,765 A | * | 4/1988 | Sydor et al. | 36/174 |
| 4,836,495 A | * | 6/1989 | McCormack | 249/83 |
| 5,013,081 A | * | 5/1991 | Cronce et al. | 296/180.1 |
| 5,557,831 A | * | 9/1996 | Kishi et al. | 28/167 |

FOREIGN PATENT DOCUMENTS

| | | | | |
|---|---|---|---|---|
| FR | 2556684 A3 | * | 6/1985 | 296/180.1 |
| JP | 01218819 A | * | 9/1898 | 425/522 |
| JP | 55105539 A | * | 8/1980 | 264/516 |
| JP | 56121738 A | * | 9/1981 | 264/516 |
| JP | 60125632 A | * | 7/1985 | 264/516 |
| JP | 61123514 A | * | 6/1986 | 264/516 |
| JP | 61220977 A | * | 10/1986 | 296/180.1 |
| JP | 61271150 A | * | 12/1986 | 180/65.1 |
| JP | 64 18785 A | * | 1/1989 | 296/180.1 |
| JP | 03069335 A | * | 3/1991 | 264/516 |
| JP | 04260880 A | * | 9/1992 | 296/180.1 |
| JP | 04303078 A | * | 10/1992 | 296/180.1 |

* cited by examiner

*Primary Examiner*—D. Glenn Dayoan
*Assistant Examiner*—Paul Chenevert
(74) *Attorney, Agent, or Firm*—Volpe and Koenig P.C.

(57) ABSTRACT

Described herein are a spoiler for vehicles and a method of manufacturing the spoiler. The spoiler has a first surface and a second surface which define an appearance of the spoiler, and a hollow part defined in the spoiler. The spoiler includes a reinforcing member which is formed integrally with the second surface and has a frame defining an appearance of the reinforcing member and holes formed in the reinforcing member, and a support unit which is secured to cover the holes of the reinforcing member and an outer surface of the frame, thus supporting the reinforcing member to the second surface. The reinforcing member is formed integrally with the second surface through blow molding.

4 Claims, 6 Drawing Sheets

( prior art )

SPOILER FOR VEHICLES AND MANUFACTURING METHOD THEREOF

BACKGROUND OF THE INVENTION

1. Field of the Invention

The present invention relates generally to a spoiler for vehicles and a method of manufacturing the spoiler and, more particularly, to a spoiler for vehicles and a method of manufacturing the spoiler, in which a support plate for mounting a nozzle is integrated with the spoiler into a single structure through injection molding, thus increasing productivity.

2. Description of the Related Art

Generally, various types of spoilers are used according to the kind of vehicle. The spoiler reduces the lift acting on a vehicle body due to airflow around the vehicle body when a vehicle runs at high speeds. Further, the spoiler increases contact force between wheels and the ground, thus preventing steering force and braking force from being reduced due to the loss of power transmitted from an engine, therefore affording stability when a vehicle runs at high speeds.

A high degree of mechanical strength is not required for the spoiler, but formability of the spoiler is important. Thus, the spoiler has been manufactured through various forming methods to achieve the reduction of a material and lightness.

Among the manufacturing methods, blow molding has been widely used. The blow molding is performed as follows. A thermoplastic material is preformed to have the shape of a tube through extrusion or injection, thus forming a parison. The parison is put into a mold, and air is blown into the parison to expand, cool, and solidify the parison. Thereby, a hollow object is produced.

Since blow molding has a low production cost products fabricated thereby are low in stress, blow molding has been widely used to form a spoiler.

A conventional spoiler for vehicles will be described below with reference to the accompanying drawing.

FIG. 1 is a perspective view showing the shape of a conventional spoiler for vehicles.

As shown in FIG. 1, the spoiler 1 for vehicles has the shape of a wing which has a streamlined cross-section and is hollow. The spoiler 1 is mounted on a trunk which is provided on the rear of a vehicle. In the case of sport-utility vehicles, the spoiler 1 is mounted to an upper edge of a rear windshield.

The spoiler 1 includes an upper surface 2 and a lower surface 3. In order to reduce the weight of the spoiler 1, a space is formed in the spoiler 1.

However, as the size of the spoiler 1 is increased, it is difficult for the spoiler 1 to maintain its shape, because of the load of the spoiler 1 and external load.

In a detailed description, rigidity is lowered because of the space formed in the spoiler 1, and the upper and lower surfaces 2 and 3 may have different thickness as a result of blow molding. Thereby, the spoiler 1 vibrates up and down or shakes due to the load of the spoiler 1 or vibrations transmitted when a vehicle runs. These problems must be solved.

Accordingly, the present invention has been made keeping in mind the above problems occurring in the prior art, and an object of the present invention is to provide a spoiler for vehicles and a method of manufacturing the spoiler, intended to prevent the spoiler from shaking due to the load of the spoiler or vibration transmitted from the exterior.

SUMMARY OF THE INVENTION

In order to accomplish the above object, the present invention provides a spoiler for vehicles having a first surface and a second surface which define an appearance of the spoiler, and a hollow part defined in the spoiler. The spoiler includes a reinforcing member which is formed integrally with the second surface and has a frame defining an appearance of the reinforcing member and holes formed in the reinforcing member, and a support unit which is secured to cover the holes of the reinforcing member and an outer surface of the frame, thus supporting the reinforcing member to the second surface. The reinforcing member is formed integrally with the second surface through blow molding.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
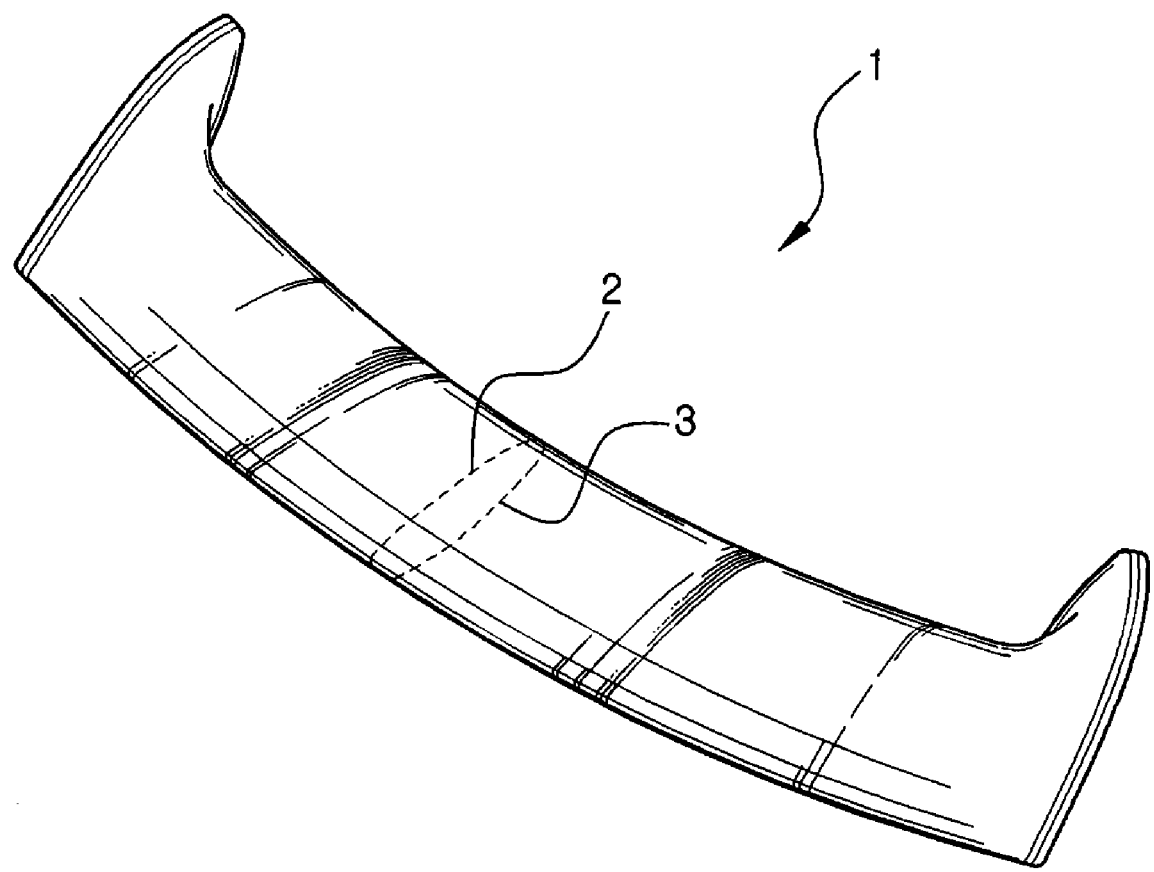
FIG. 1 is a perspective view showing a conventional spoiler for vehicles.

The present invention provides a spoiler for vehicles having a first surface and a second surface which define an appearance of the spoiler, and a hollow part defined in the spoiler, the spoiler including a reinforcing member which is formed integrally with the second surface and has a frame defining an appearance of the reinforcing member and holes formed in the reinforcing member, and a support unit which is secured to cover the holes of the reinforcing member and an outer surface of the frame, thus supporting the reinforcing member to the second surface.

Preferably, the reinforcing member is formed integrally with the second surface through blow molding.

Further, the holes of the reinforcing member have a lattice arrangement.

The present invention provides a method of manufacturing a spoiler for vehicles, using an upper mold and a lower mold which define a cavity, the method including installing a reinforcing member on the lower mold, putting a parison into the cavity after the reinforcing member has been installed, forming the parison into a shape of the cavity by supplying hot air into the parison, and forming a support unit such that one surface thereof surrounds the reinforcing member, while the parison is formed into the shape of the cavity.

Preferably, the forming the support unit includes forming a hole in the reinforcing member, and inserting part of the parison into the hole, thus forming a support protrusion.

Further, a mounting projection is provided at a junction between the lower mold and the reinforcing member to be mounted to the lower mold, thus securing the reinforcing member to the lower mold.

Furthermore, the mounting projection is inserted into the hole formed in the reinforcing member.

According to the present invention, a reinforcing member having a hole is integrated with a spoiler through blow molding, so that it is easier to form the spoiler, and the rigidity of the spoiler is increased, thus preventing the spoiler from shaking due to the load of the spoiler or vibrations transmitted from the exterior, therefore increasing the operational reliability of the spoiler.

Hereinafter, a spoiler for vehicles and a method of manufacturing the spoiler according to the preferred embodiment of the present invention will be described with reference to the accompanying drawings. For ease and convenience of description, the thickness of lines and the size of components in the drawings may be exaggerated. Further, the terms used herein are defined in consideration of the function of this invention, and may be varied according to the user's intention. Therefore, the terms should be defined based on the overall content of the invention.

Figure 2:
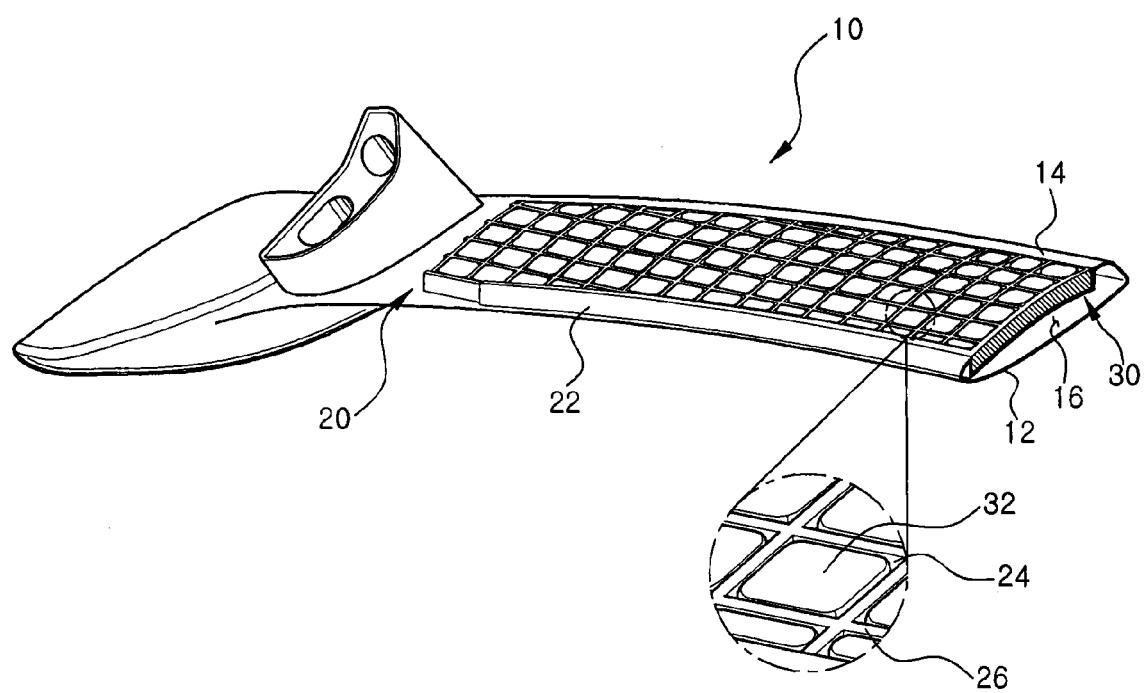
FIG. 2 is a partial cutaway perspective view showing a spoiler for vehicles, according to the preferred embodiment of the present invention.
Figure 3:
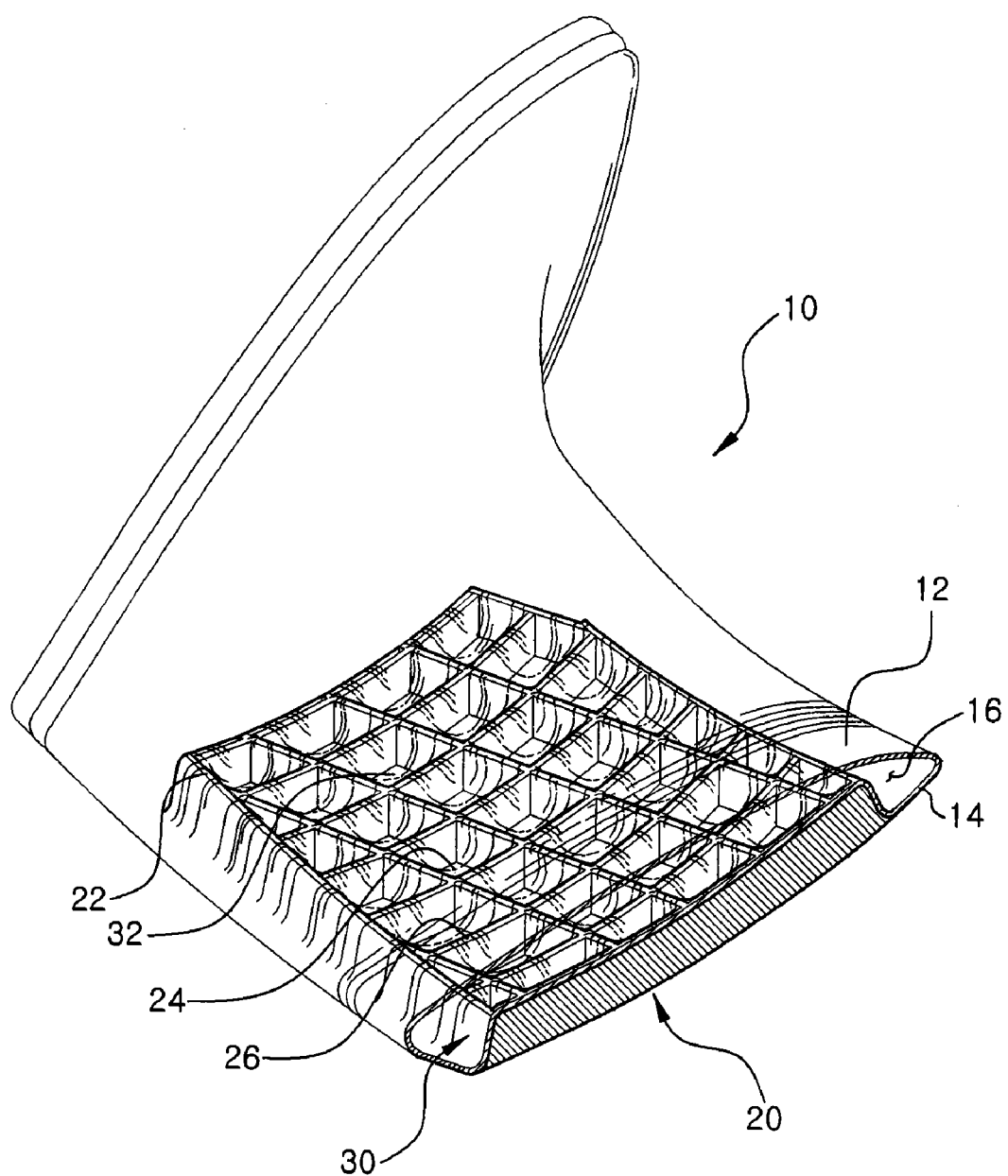
FIG. 3 is a perspective view showing the state where the spoiler of FIG. 2 is inverted.
Figure 4:
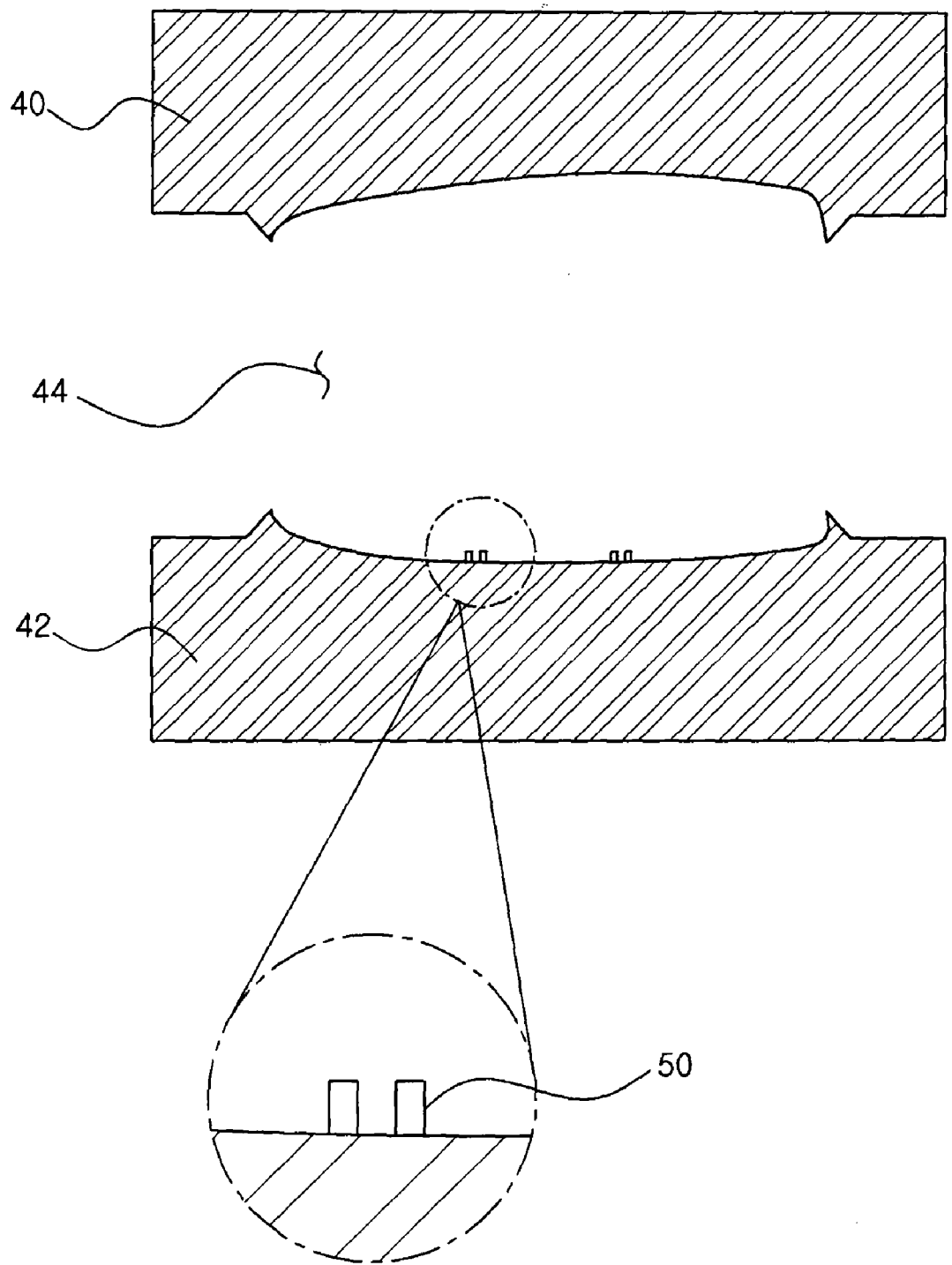
FIG. 4 is a sectional view showing a mold for manufacturing the spoiler for vehicles, according to the preferred embodiment of the present invention.
Figure 5:
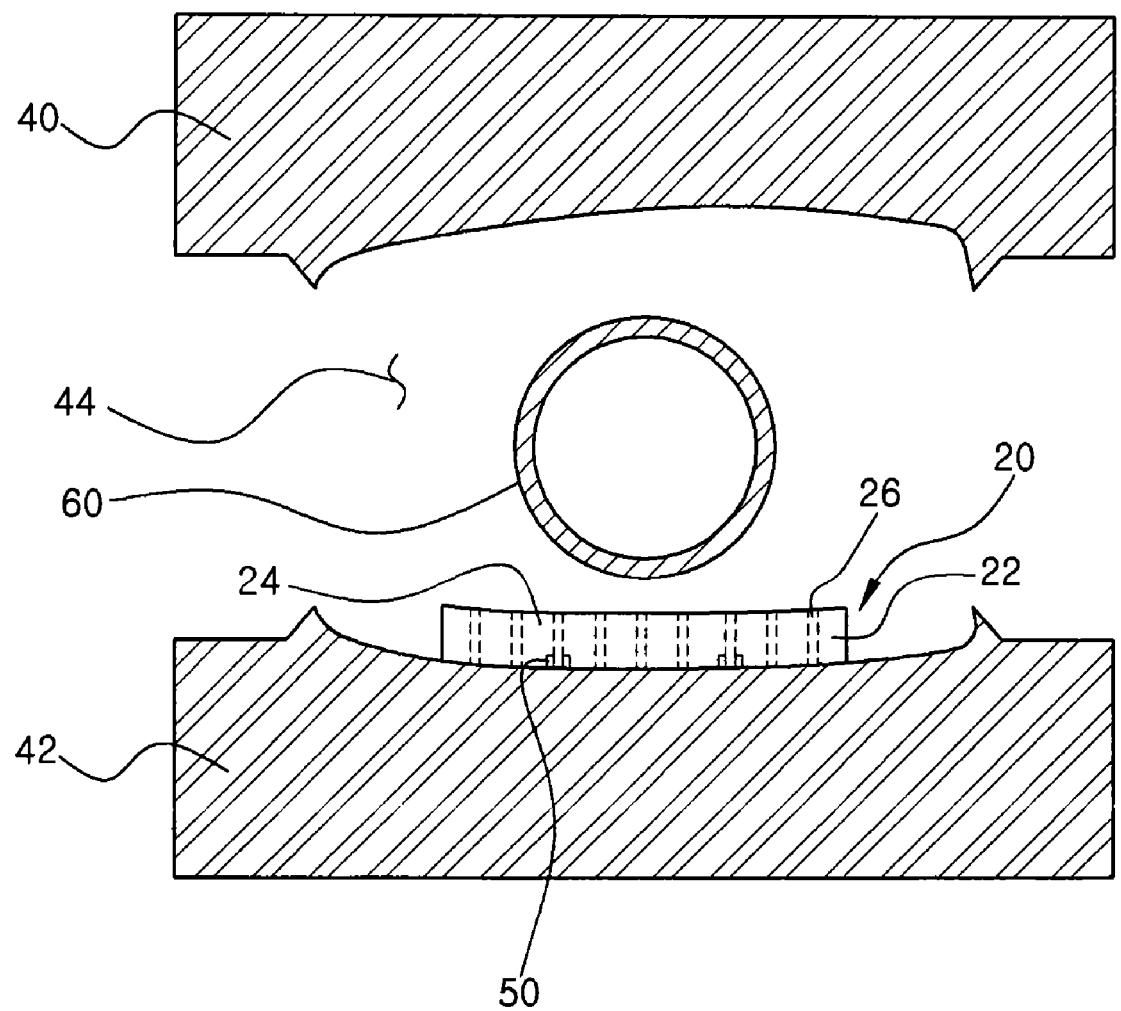
FIG. 5 is a view showing the state where a reinforcing member is installed and a parison is put in the mold of FIG. 4.
Figure 6:
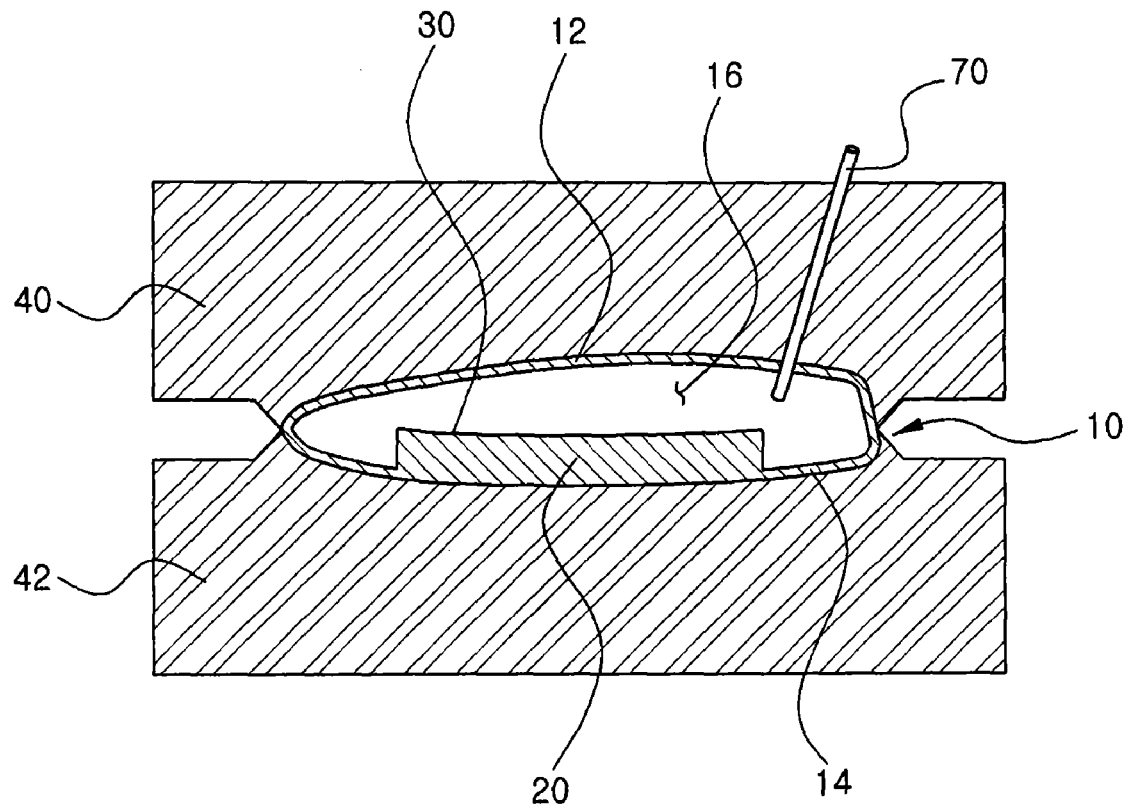
FIG. 6 is a view showing the state where the spoiler is formed to surround the reinforcing member by blowing hot air into the parison of FIG. 5.

FIG. 2 is a partial cutaway perspective view showing a spoiler for vehicles, according to the preferred embodiment of the present invention, FIG. 3 is a perspective view showing the state where the spoiler of FIG. 2 is inverted, FIG. 4 is a sectional view showing a mold for manufacturing the spoiler for vehicles, according to the preferred embodiment of the present invention, FIG. 5 is a view showing the state where a reinforcing member is installed and a parison is put in the mold of FIG. 4, and FIG. 6 is a view showing the state where the spoiler is formed to surrounding the reinforcing member by blowing hot air into the parison of FIG. 5.

As shown in FIGS. 2 and 3, the spoiler 10 for vehicles includes a first surface 12 and a second surface 14, which define the appearance of the spoiler 10, with a hollow part 16 being defined in the spoiler 10.

Assuming that a surface facing upwards is designated as an upper surface when the spoiler 10 is mounted to a vehicle, the first surface 12 is an upper surface, and the second surface 14 is a lower surface.

However, the designation is only one embodiment. That is, according to another embodiment of the invention, the first surface 12 may be a lower surface, and the second surface 14 may be an upper surface.

A reinforcing member 20 is formed integrally with the second surface 14. Thus, the reinforcing member 20 is coupled to the spoiler 10 without an additional fastening operation.

The reinforcing member 20 includes a frame 22 which defines the appearance of the reinforcing member 20. Reinforcing ribs 26 are provided in the frame 22 such that the reinforcing ribs 26 cross each other. Space defined between the crossing reinforcing ribs 26 allows upper and lower portions to communicate with each other, thus providing holes 24.

According to the embodiment of this invention, the holes 24 are formed to have a lattice arrangement. Thus, the reinforcing member 20 has maximum strength for load.

The holes 24 may have various shapes, including a circular shape and a honeycomb shape, without being limited to a rectangular shape.

The reinforcing member 20 constructed as described above is integrated with the second surface 14 of the spoiler 10 through blow molding.

Further, a support unit 30 is formed to cover the holes 24 of the reinforcing member 20 and the outer surface of the frame 22. The reinforcing member 20 is secured to the second surface 14 by the support unit 30.

In this case, part of the support unit 30 is inserted into the holes 24 of the reinforcing member 20, thus forming support protrusions 32. The reinforcing ribs 26 are fitted between the support protrusions 32 to be supported by the support protrusions 32. Thereby, the reinforcing member 20 is secured to the second surface 14.

The method of manufacturing the spoiler for vehicles, constructed as described above, will be described with reference to the accompanying drawings.

As shown in FIG. 4, in order to form the spoiler 10, a cavity 44 is formed between an upper mold 40 and a lower mold 42.

In order to prevent the slippage or removal of the reinforcing member 20 after the reinforcing member 20 is placed on the lower mold 42, mounting projections 50 are provided on the upper portion of the lower mold 42.

Further, as shown in FIG. 5, the reinforcing member 20 is mounted to the lower mold 42.

That is, the reinforcing member 20 is mounted to the lower mold 42 using the mounting projections 50, which project from a junction between the lower mold 42 and the reinforcing member 20 to be mounted on the lower mold 42. However, such a construction is only one embodiment of the present invention. As long as the reinforcing member 20 remains on the lower mold 42 during a blow molding operation, the mounting projections 50 or other mechanical components may be changed.

Preferably, the mounting projections 50 are inserted into the holes 24 formed in the reinforcing member 20, so that the exposure of grooves formed by the mounting projections 50 to the outside is minimized.

Further, after the reinforcing member 20 has been installed, a parison 60 is put into the cavity 44.

As shown in FIG. 6, after the upper mold 40 is moved downwards, hot air is fed into the parison 60 through a supply pipe 70. Thereby, the parison 60 is formed into the shape of the cavity 44.

While the parison 60 is formed into the shape of the cavity 44, the support unit 30 is formed such that one surface of the support unit 30 covers the reinforcing member 20.

That is, the parison 60 is made fluid by the hot air. Thus, the parison 60 contacting the reinforcing member 20 surrounds the reinforcing ribs 26 and the frame 22 of the reinforcing member 20. Part of the parison 60 enters the holes 24, thus forming the support protrusions 32. Thereby, the support unit 30 for supporting the reinforcing member 20 to the spoiler 10 is obtained.

Since the reinforcing member 20 is provided with the holes 24, coupling force between the reinforcing member 20 and the support unit 30 can be increased. However, the holes 24 may be omitted when necessary.

Further, since the reinforcing member 20 is applied to the spoiler 10, the strength of the spoiler 10 is increased. Thereby, the thickness of the reinforcing member 20 may be reduced compared to that of a conventional reinforcing member, so that a weight is reduced.

As described above, according to the present invention, the reinforcing member 20 having the holes 24 is formed integrally with the spoiler 10 which is fabricated through blow molding, so that it is easier to form the spoiler 10, and the strength of the spoiler 10 is increased, thus preventing the spoiler 10 from shaking due to the load of the spoiler 10 or vibrations transmitted from the exterior, therefore increasing the operational reliability of the spoiler 10.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, a spoiler for vehicles and a method of manufacturing the spoiler according to the present invention increase the strength of the spoiler, unlike the prior art, thus minimizing vibration and shaking of the spoiler, therefore providing highly reliable and durable operation.

Further, the spoiler is formed integrally with a reinforcing member through blow molding, so that an additional assembly operation is not required, and thus productivity is increased.

What is claimed is:

1. A spoiler for vehicles having a first surface and a second surface which define an appearance of the spoiler, and a hollow part defined in the spoiler, the spoiler comprising:
   a reinforcing member formed integrally with the second surface, and having a frame defining an appearance of the reinforcing member and holes formed in the reinforcing member; and
   a support unit comprising a support protrusion inside the holes of the reinforcing member and an outer surface of the frame, thus supporting the reinforcing member to the second surface, wherein the holes of the reinforcing member have a lattice arrangement.

2. The spoiler as set forth in claim 1, wherein the reinforcing member is formed integrally with the second surface through blow molding.

3. A method of manufacturing a spoiler for vehicles, using an upper mold and a lower mold which define a cavity, the method comprising:
   installing a reinforcing member on the lower mold;
   putting a parison into the cavity after the reinforcing member has been installed;
   forming the parison into a shape of the cavity by supplying hot air into the parison; and
   forming a support unit such that one surface thereof surrounds the reinforcing member, while the parison is formed into the shape of the cavity,
   wherein a mounting projection is provided at a junction between the lower mold and the reinforcing member to be mounted to the lower mold, thus securing the reinforcing member to the lower mold and the mounting projection is inserted into a hole formed in the reinforcing member.

4. The method of manufacturing the spoiler as set forth in claim 3, wherein the forming of the support unit comprises:
   forming a aperture in the reinforcing member; and
   inserting part of the parison into the aperture, thus forming a support protrusion.

* * * * *